No. 651,772. Patented June 12, 1900.
A. J. ROBERTSON.
AXLE BEARING.
(Application filed Mar. 26, 1900.)
(No Model.)
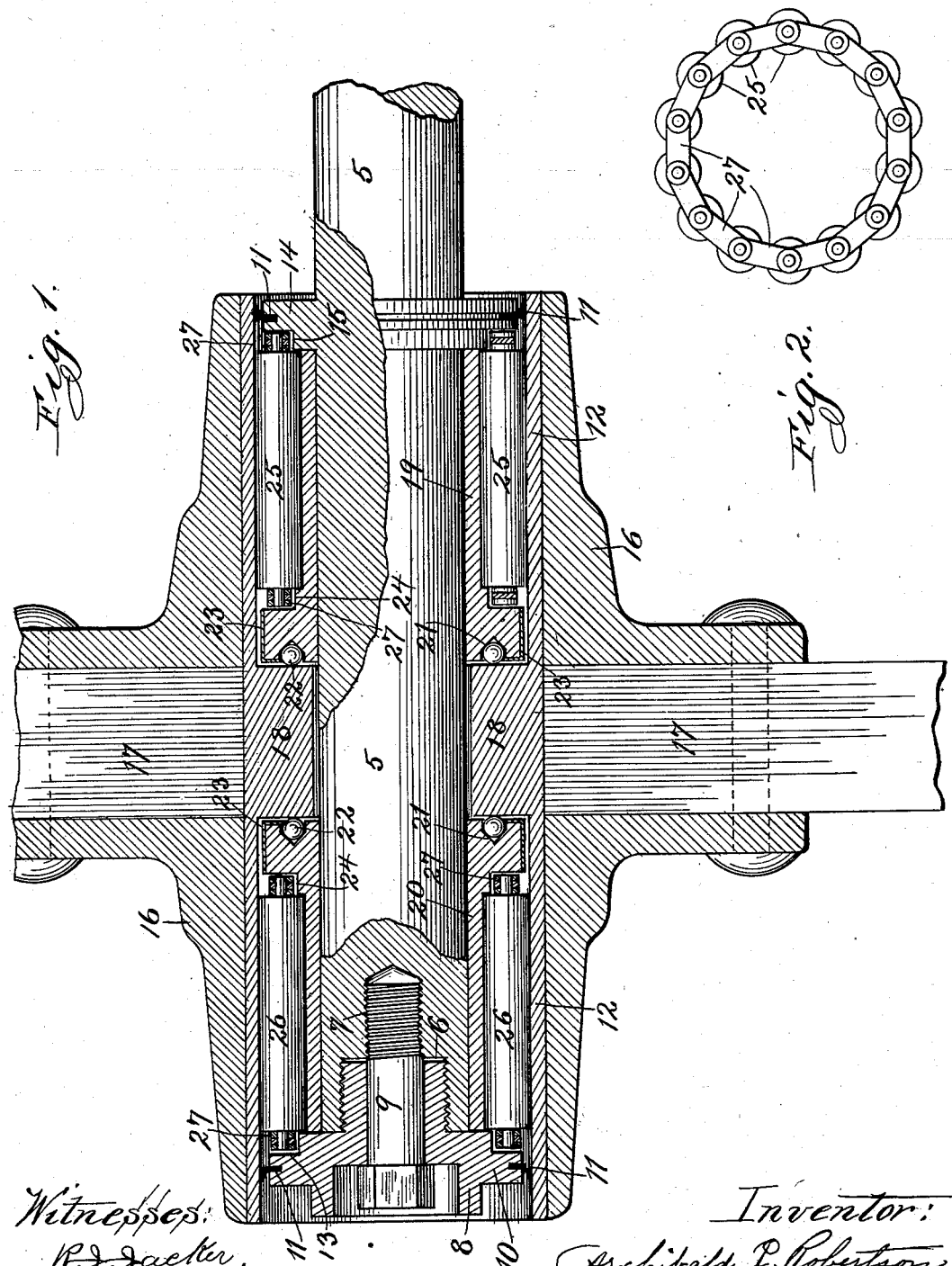
Witnesses:
Inventor:
Archibald J. Robertson

UNITED STATES PATENT OFFICE.

ARCHIBALD J. ROBERTSON, OF CHICAGO, ILLINOIS.

AXLE-BEARING.

SPECIFICATION forming part of Letters Patent No. 651,772, dated June 12, 1900.

Application filed March 26, 1900. Serial No. 10,278. (No model.)

*To all whom it may concern:*

Be it known that I, ARCHIBALD J. ROBERTSON, a subject of the Queen of Great Britain, residing at Chicago, in the county of Cook and State of Illinois, have invented certain new and useful Improvements in Axles and Bearings for Vehicles, of which the following is a specification.

This invention relates to axles and bearings for vehicles generally, but is especially applicable to automobiles and other vehicles when sensitiveness and economy in the motive power and great strength and durability are desirable.

The principal object of my invention is to provide bearings for vehicles which shall be almost frictionless and noiseless in operation, yet simple and inexpensive in construction and strong and durable, and in which the parts may be readily assembled or replaced when worn without interference with the main portions thereof.

Another equally-important object of the invention is to furnish bearings in which the lateral or end thrusts between the hub action and the axle are frictionless, or nearly so, and will be located about the middle of the hub or the middle of that portion of the axle which is surrounded by the hub, thus giving to the hub a slight pivotal movement at said point, while its end portions are free.

Other objects and advantages will appear in the subjoined description.

In order to enable others skilled in the art to which my invention pertains to make and use the same, I will now proceed to describe it, referring to the accompanying drawings, in which—

Figure 1 is a longitudinal sectional view of a wheel-hub, showing a part of the axle and the parts of the bearings inclosed therein; and Fig. 2 is a detached view, in end elevation, of one set of the rollers.

In the drawings corresponding numerals of reference indicate like parts.

The axle 5 is formed at its free end with two sockets or openings 6 and 7, which openings are oppositely screw-threaded, the socket 6 receiving and engaging the screw-threaded nut 8, while the socket 7 receives and engages the threaded portion of the bolt 9, which passes through a suitable opening in the nut 8 and preferably has its head countersunk in the outer end of said nut. The head 10 of the nut 8 is circular in form and has located in a suitable groove in its periphery a dust-guard 11, made of rubber or other suitable material, to close the outer end of the sleeve 12, so as to exclude dust and dirt therefrom. The inner surface of the head 10 of the nut 8 is formed with an annular recess 13 for the operation of the ends of one of the sets of rollers. The axle is formed or provided at about the rear portion of the hub with an annular flange 14, in the periphery of which is located a dust-guard 11, which is used for the same purpose as the one in the front part of the hub and just above described. The inner surface of the flange or collar 14 is formed with an annular grove 15 for the operation of the ends of another set of rollers.

The hub 16 may be made of metal or other suitable material and is provided, as usual, with spokes 17, which may be secured in position by any suitable means. Fitted snugly within the hollow of the hub is an outer sleeve 12, which is preferably made of hardened steel and has in its middle portion an inwardly-extending annular enlargement 18, against which the sectional or inner sleeves have their bearings. The inner sleeves 19 and 20 are also preferably made of hardened steel and of sufficient size to fit closely around the axle and to be firmly secured thereon. Each of these sleeves has in its end adjacent to the enlargement 18 of the outer sleeve an annular groove 21 for the reception and operation of antifriction-balls 22, which balls are retained in position by means of caps 23, fitted on the adjacent ends of said sleeves and extending slightly over said grooves, which grooves are substantially V-shaped in cross-section, as is clearly seen by reference to the drawings, and which peculiar shape of said grooves reduces the contact-points of the balls which they hold. The inner or sectional sleeves 19 and 20 are each provided near their adjacent ends with annular recesses 24 for the reception and operation of the adjacent ends of the two sets 25 and 26 of rollers, which rollers are united at their ends by means of links 27, in which the reduced ends of said rollers are secured.

In assembling the parts the sectional or inner sleeve 19, having thereon the rollers 25, is placed on the free end of the axle and forced thereon till the rear end of said sleeve contacts with the inner surface of the flange 14 on the axle. The hub having therein the inner sleeve 12 is then placed in position over the sleeve 19 and on the axle, when the sectional or inner sleeve 20, carrying its set of rollers 26 and antifriction-balls 22, may be placed in position on the axle and firmly secured thereto. The nut 8 is then secured into the socket 6 of the axle, which operation by reason of the impingement of the inner surface of the head 10 of said nut will force the sleeve 20 toward the enlargement 18 of the outer sleeve and will thus hold the various parts of the device in their proper positions. By employing the bolt 9, which, as before stated, is provided with oppositely-formed screw-threads from those on the nut 8, it is apparent that said nut will be firmly locked in position, so as to prevent its accidental displacement.

By employing a construction embodying my invention it is apparent that the sleeves 12, 19, and 20, as well as the rollers, can be hardened much more readily than the axle, and that a very strong, durable, efficient, and smoothly-running bearing is afforded.

Having thus fully described my invention, what I claim as new, and desire to secure by Letters Patent, is—

1. The combination with a hub, of a sleeve located in the hollow thereof and provided with an annular inner enlargement at about its middle, an axle extending into said sleeve and having an annular flange, an inner sleeve located on the axle on each side of the said enlargement of the outer sleeve, rollers interposed between the outer sleeve and the inner ones, antifriction-balls interposed between the enlargement of the outer sleeve and the ends adjacent thereto of the inner sleeves, and means secured to the outer or free end of the axle to adjust the parts and hold them in position, substantially as described.

2. The combination with a hub, of a sleeve located in the hollow thereof and provided with an annular inner enlargement at about its middle, an axle located in said sleeve and having an annular flange near the rear end of the hub, said axle having in its free end two sockets oppositely screw-threaded, an inner sleeve located on the axle on each side of the said enlargement of the outer sleeve and each having a groove in its end adjacent to the said enlargement, rollers interposed between the outer sleeve and the inner ones, antifriction-balls interposed between the enlargement of the outer sleeve and the ends adjacent thereto of the inner sleeves, a hollow nut secured to the free end of the axle, and a bolt passing through said nut and secured to the free end of the axle, substantially as described.

ARCHIBALD J. ROBERTSON.

Witnesses:
CHAS. C. TILLMAN,
A. GUSTAFSON.